United States Patent
Elmusa et al.

(10) Patent No.: US 8,287,930 B2
(45) Date of Patent: Oct. 16, 2012

(54) FREE-FLOWING EGG REPLACEMENT PRODUCT AND PROCESS OF MAKING SAME

(75) Inventors: Ali A. Elmusa, Leawood, KS (US); Charles A. Morris, Overland Park, KS (US); Huey L. Willis, Raymore, MO (US)

(73) Assignee: Archer Daniels Midland Company, Decatur, IL (US)

( * ) Notice: Subject to any disclaimer, the term of this patent is extended or adjusted under 35 U.S.C. 154(b) by 1025 days.

(21) Appl. No.: 12/187,798

(22) Filed: Aug. 7, 2008

(65) Prior Publication Data
US 2009/0041901 A1 Feb. 12, 2009

Related U.S. Application Data

(60) Provisional application No. 60/954,644, filed on Aug. 8, 2007.

(51) Int. Cl.
A23L 1/035 (2006.01)

(52) U.S. Cl. .......... 426/72; 426/549; 426/656; 426/655; 426/555

(58) Field of Classification Search .................. 426/656, 426/72, 549, 655, 555
See application file for complete search history.

(56) References Cited

U.S. PATENT DOCUMENTS

| | | | |
|---|---|---|---|
| 3,864,500 A | 2/1975 | Lynn | |
| 4,103,038 A | 7/1978 | Roberts | |
| 4,120,986 A | 10/1978 | Lynn | |
| 4,238,519 A | 12/1980 | Chang | |
| 4,499,113 A | 2/1985 | Mochizuki et al. | |
| 5,403,610 A * | 4/1995 | Murphy et al. | 426/549 |
| 6,090,433 A | 7/2000 | Sterner et al. | |
| 6,113,975 A | 9/2000 | Grace et al. | |
| 6,878,394 B2 | 4/2005 | Bodor et al. | |
| 7,803,414 B2 * | 9/2010 | Van Lengerich et al. | 426/89 |
| 2002/0037351 A1 | 3/2002 | Sarneel | |
| 2002/0037352 A1 | 3/2002 | Messager et al. | |
| 2002/0051843 A1 | 5/2002 | Baker et al. | |
| 2002/0061359 A1 | 5/2002 | Baker et al. | |
| 2003/0054509 A1 | 3/2003 | Lee et al. | |
| 2003/0134023 A1 | 7/2003 | Anfinsen | |
| 2003/0215559 A1 * | 11/2003 | Mikaelian et al. | 426/634 |
| 2005/0037125 A1 | 2/2005 | Maningat et al. | |
| 2005/0181113 A1 | 8/2005 | Bodor | |
| 2005/0287267 A1 | 12/2005 | Maningat et al. | |
| 2006/0008568 A1 * | 1/2006 | Elmusa et al. | 426/549 |
| 2007/0014914 A1 | 1/2007 | Borders et al. | |
| 2007/0077345 A1 | 4/2007 | Borders et al. | |
| 2007/0128340 A1 * | 6/2007 | Andrews et al. | 426/656 |
| 2008/0181990 A1 | 7/2008 | Ledbetter et al. | |
| 2008/0254200 A1 | 10/2008 | Bassi et al. | |
| 2009/0031775 A1 * | 2/2009 | Bevans et al. | 71/23 |

FOREIGN PATENT DOCUMENTS

| | | |
|---|---|---|
| EP | 0032833 | 7/1981 |
| EP | 1452098 | 5/2007 |
| JP | 04349859 | 12/1992 |
| WO | WO-94/02032 | 2/1994 |
| WO | WO-2004/016103 | 2/2004 |
| WO | WO-2004/016116 | 2/2004 |
| WO | WO-2005/079605 | 9/2005 |

OTHER PUBLICATIONS

Sipernat 50/50S, Product Information, Degussa Corporation, Apr. 1982.
Grindsted® PGMS USV-A K Propylene Glycol Ester, Product Information, Dansico Cultor, date unknown.
Prolite™ 100 Wheat Protein Isolate, Product Data Sheet, ADM, date unknown.
Lecithin U.F., Technical Data Sheet, ADM Arkady, Jan. 23, 2003.
Panalite® 50 SV K, Technical Data Sheet, ADM Arkady, Mar. 21, 2003.
Prolite® Low Flavor Vital Wheat Gluten, Product Detail Page, ADM, available at http://www.admworld.com/naen/productdb/details.asp?code=225 (last visited Nov. 3, 2006).
Powdered MPB 45 LT Emulsifier Blend, Product Information, ADM, Dec. 21, 2005.
Powdered MPB 45 LT Emulsifier Blend, Nutritional Profile, ADM, Apr. 2006.
Microsieving Powder Characterization, Topas GmbH, 1998.
Freeman et al., The Flowability of Wet and Dry Powders, 20th Pharmaceutical Technology Conference, Apr. 2001.
Prolite™ Functional Wheat Proteins, Product Information, ADM, 2005.
Baking, ADM, 2004.
Automated Dry Powder Flowability Analysis, Sample Applications, TSI Incorporated, 2005.
Powder Pharmaceutical Instruments, Aero-Flow Applicaton Note #7, TSI Incorporated, Jun. 2005.
EZ Cake Powdered Cake Emulsifier, Technical Data Sheet, ADM Arkady, Oct. 21, 2002.
Micron Powder Characteristics Tester, Instruction Manual, pp. 2, 23-29, Hosokawa Micron Corporation, date unknown.

* cited by examiner

Primary Examiner — Anthony Weier
(74) Attorney, Agent, or Firm — Andrew F. Nilles

(57) ABSTRACT

A free-flowing composition for reducing or replacing the egg and emulsifier content in baked goods and baked good mixes and a method of making the composition. In some embodiments, the composition may include a single free-flowing ingredient. In certain embodiments, the composition includes a wheat protein isolate and an emulsifier. In other embodiments, the composition additionally includes a flow agent. In one embodiment, the composition includes a wheat protein isolate, a propylene glycol ester, a glyceride, and a lecithin. Other embodiments may include a food product comprising the composition.

21 Claims, No Drawings

FREE-FLOWING EGG REPLACEMENT PRODUCT AND PROCESS OF MAKING SAME

CROSS-REFERENCE TO RELATED APPLICATIONS

This application claims the benefit of U.S. Provisional Application No. 60/954,644, filed Aug. 8, 2007, the contents of the entirety of which are incorporated by reference.

TECHNICAL FIELD

The technology of the present disclosure relates to a composition for reduction, replacement of and/or mimicking the functions of eggs and emulsifiers and its use in food systems.

BACKGROUND

Baked goods, such as, cakes, cookies, muffins, bread and rolls, and various baked snacks, are popular foods with many common ingredients. These ingredients may include, for example, but not limited to, one or more of flour, sugar, oil, water, butter, and eggs or an egg protein-based agent. The dough, batter, or other material is typically a combination of two or more of these many ingredients.

Egg and egg protein-based agents in commercially available baked products, such as, for example, cakes and cookies, may serve as an emulsifying agent to help stabilize the oil/water emulsion, in addition to imparting a desirable flavor and/or texture to the product. However, egg-based agents may possess undesirable characteristics, making their inclusion in the formulation problematic. Some of these undesired characteristics include, for example, but not limited to, problems with egg allergies, medical problems associated with cholesterol levels in eggs, religious restrictions/convictions, culinary preferences (such as, for example, a vegetarian or vegan diet), high cost and/or cost fluctuations in the price of eggs, use of antibiotics and hormones during poultry production, and diseases associated with poultry (such as, for example, bird flu). Therefore, in certain baked products it may be desirable to reduce or eliminate the content of egg and/or egg-based protein. However, eggs and egg-based protein agents can impart certain desirable qualities in baked products, for example, taste, strength, stability, and/or firmness. Thus, a substitute for the egg or egg based protein agent that can provide the desired characteristics of eggs while reducing the undesired characteristics would be useful.

In a baked good, emulsifying agents allow insoluble components of the composition, such as the water and the oil, to form a uniform emulsion before heating, and thus produce a uniform final baked good after heating. Emulsifying agents, however, may add height or volume to a baked good thereby weakening the structure of the baked good, and therefore the egg or egg based protein agent may be used to add strength to the baked good because of the added height or volume. Decreasing egg content due to the undesirable properties of eggs may have the unwelcome effects of reducing the strength, stability, and/or firmness of the baked good. This reduction of strength, stability, and firmness may lead to other undesirable qualities, such as reduced volume and increased runniness. In order to reduce the use of egg and egg-based protein agents because of their undesirable qualities, and yet maintain the desirable physical properties of a baked product, the use of alternative proteinaceous emulsifying agents may be desired.

Wheat flour is ideal for making bread and other baked goods since the storage proteins of wheat form a strong, cohesive dough that retains gas bubbles, such as carbon dioxide, produced during rising of bread products to produce light, baked products. The wheat proteins may be isolated from wheat flour by removing starch and albumins/globulins by gently working the dough under a stream of water. After washing, a rubbery ball remains comprising the wheat gluten proteins, which are known as "vital wheat gluten". Traditionally, gluten proteins have been classified into four families according to their solubility: albumins, which are soluble in water or dilute salt solutions and are coagulated by heat; globulins, which are insoluble in pure water but soluble in dilute aqueous salt solutions and insoluble in concentrated aqueous salt solutions; prolamins, which are soluble in aqueous alcohol; and glutelins, which are soluble in dilute acid or bases, detergents, or dissociating or reducing agents, such as urea or 2-mercaptoethanol, respectively.

The prolamins are considered to be unique to the seed of cereals and other grains or grasses. The prolamins have been given different names in different cereals, such as: gliadin in wheat, avenins in oats, zeins in maize, secalins in rye, and hordein in barley. The gliadins and glutenins of wheat are the storage proteins of the wheat endosperm. Wheat gluten can be described as having a bimodal distribution between gliadin and glutenin. Wheat gluten composition is a major factor in determining wheat dough mixing strength and processing characteristics.

Gliadin, or the gliadin fraction of gluten, has a low ionic strength and excellent film forming properties. Gliadin is insoluble in water; however, its solubility may be modified with the addition of a surfactant and/or adjustment of the pH by acidification. Typical acids suitable for solubilizing gliadin include citric acid, malic acid, lactic acid, oxalic acid, tartaric acid, ascorbic acid, and acetic acid. Gliadin may absorb up to twice its weight of water.

Glutenin, or the glutenin fraction of gluten, is highly elastic and rubbery and is also resistant to shear. Glutenin is insoluble in alcohol and neutral water, however, its solubility may be modified with the addition of a surfactant and/or adjustment of the pH. The protein structure of glutenin is stabilized by interchain disulfide bonds.

Vital wheat gluten is approved by the U.S. Food and Drug Administration as Generally Recognized as Safe (GRAS) under 21 C.F.R. §184.1322 for use as a dough strengthener, formulation aid, nutrient supplement, processing aid, stabilizer and thickener, surface finishing agent, and texturizing agent at levels not to exceed current good manufacturing practice. Vital wheat gluten is defined as a viscoelastic gluten that is extensible when hydrated. As used herein, the term "extensible" includes capable of being stretched without tearing.

Through further removal of non-protein constituents, the protein content of vital wheat gluten can be increased. The functional properties of this protein may also be modified through the use of acids, reducing agents, phosphates, enzymes, and combinations of any thereof to convert the proteins to a "wheat protein isolate".

Egg replacers and emulsifiers, separately, are known. However, the known egg replacers may not be easy to process or easy to incorporate into food products, nor may they satisfactorily reproduce the texture and flavor associated with baked goods containing eggs or egg based protein agents. Other types of protein may produce a noticeable, undesirable flavor in a baked good when used as a replacement for egg or egg-based protein. In addition, other types of protein may themselves have other undesirable characteristics such as, but not limited to, having allergenic properties. In addition, the prior art egg replacers and emulsifiers may also be liquid, making them difficult to transport and also difficult to scale; and the known compositions may not be configured to replace a substantial percentage of the egg in the baked good. Thus, there is a need for new, easy to use egg replacement and emulsifier systems.

SUMMARY

Various embodiments of the present disclosure relate to free-flowing compositions, processes for producing food compositions, and systems comprising wheat protein isolates and emulsifiers.

One embodiment provides a free-flowing composition comprising a wheat protein isolate and an emulsifier.

Other embodiments provide a composition comprising a wheat protein isolate, a propylene glycol ester, a glyceride, and a lecithin.

Still other embodiments provide a process for producing a food composition comprising combining a wheat protein isolate and an emulsifier to form a free-flowing mixture.

Further embodiments provide a system comprising a first composition comprising a protein isolate, and a second composition comprising an emulsifier.

Still further embodiments provide a composition consisting essentially of wheat protein isolate, a flow agent, and an emulsifier selected from the group consisting of a propylene glycol monoester, a monoacylglyceride, a lecithin, and combination of any thereof.

It should be understood that the invention is not limited to the embodiments disclosed in this summary, and is intended to cover modifications that are within the spirit and scope of the invention, as defined by the claims.

DETAILED DESCRIPTION

In one embodiment, a composition may be used to replace the egg and the emulsifiers in baked goods or a baked good mix, wherein the composition may comprise a wheat protein isolate or modified wheat protein isolate, and an emulsifier. In other embodiments, a composition may be used as a single ingredient that is free-flowing and easy to scale. Other embodiments relate to compositions comprising a wheat protein isolate, an emulsifier, and a flow agent. Still other embodiments relate to compositions comprising a wheat protein isolate, an emulsifier, a flow agent, and at least one additional ingredient. In addition, methods for forming and using the various embodiments of the compositions described herein are also disclosed.

Other than the operating examples, or where otherwise indicated, all numbers expressing quantities of ingredients, processing conditions and the like used in the specification and claims are to be understood as being modified in all instances by the term "about". Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical values, however, may contain certain errors, such as, for example, equipment and/or operator error, necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of less than or equal to 10.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The present disclosure describes several different features and aspects of the invention with reference to various exemplary embodiments. It is understood, however, that the invention embraces numerous alternative embodiments, which may be accomplished by combining any of the different features, aspects, and embodiments described herein in any combination that one of ordinary skill in the art would find useful.

According to certain embodiments, the present disclosure includes compositions and methods of reducing or replacing the egg and emulsifiers in baked goods, and related food systems. In certain embodiments, the composition comprises a wheat protein isolate and emulsifier combined into a free-flowing, readily scalable ingredient. According to other embodiments, the composition may comprise a modified wheat protein isolate and an emulsifier, which may be combined with one or more flow agents, and/or other food ingredients, and may be used to reduce or replace eggs and emulsifiers in baked goods, when combined with other traditional ingredients such as, but not limited to, flour, sugar, and water. In certain embodiments, the composition may replace some or all of the egg and emulsifier in a baked good. In other embodiments, the composition may be used in baked goods that do not traditionally contain eggs, in order to enhance certain physical properties of the baked good.

Certain embodiments of the present disclosure include a free-flowing composition comprising a wheat protein isolate and an emulsifier. According to certain embodiments, the composition may be substantially free of egg or an egg-based protein agent. As used herein, with reference to the content of egg or egg-based protein, the term "substantially free" includes less than 0.1% by weight of egg or egg-based protein. In other embodiments, the term "substantially free" includes less than 0.01% by weight of egg or egg-based protein agent.

In one embodiment, the wheat protein isolate may be isolated from wheat gluten or vital wheat gluten by further removal of the starch and albumins/globulins by gently working the wheat gluten under a stream of water. After washing, a rubbery ball remains comprising the vital wheat gluten. The wheat gluten may be treated, as described herein, to yield a wheat protein isolate that comprises a component of the compositions to replace or reduce eggs and emulsifiers in baked goods as described in the various embodiments disclosed herein. The wheat proteins may be treated with an acid and/or a reducing agent, which in certain embodiments may further include treating with a phosphate, to yield the wheat protein isolate. While treatment with acid and/or a reducing agent may be one method of producing the wheat protein isolate, other methods of treating the wheat proteins may be employed. For example, using an enzyme, such as, but not limited to, a protease or a deamidase, to modify or break at least some of the inter- and intra-strand bonds between the wheat protein strands, yielding a wheat protein isolate suitable for use in the various embodiments of the present disclosure may be employed. Methods suitable for forming modified wheat proteins or proteins for use in the various embodiments of the present disclosure may be found for example, in compositions or methods set forth in co-pending U.S. Non-provisional application Ser. Nos. 11/473,662 filed Jun. 23, 2006; 11/540,080 filed Sep. 29, 2006; and U.S. Non-provisional application Ser. No. 12/011,067, filed Jan. 24, 2008, the disclosures of each of which are incorporated in their entirety by reference herein. In addition, a wheat protein isolate substantially free of sulfites is set forth in co-pending U.S. Non-provisional application Ser. No. 12/082,441, filed Apr. 11, 2008, the disclosure of which is incorporated in its entirety by reference herein.

Treating the wheat protein isolate with combinations of organic and/or inorganic acids, may result in deamidation of the gluten proteins of the wheat protein isolate. Suitable organic acids include, without limitation, citric acid, ascorbic acid, tartaric acid, malic acid, lactic acid, fumaric acid, propionic acid, succinic acid, acetic acid, oxalic acid, and combinations thereof. Suitable inorganic acids include, but are not limited to, phosphoric acid, hydrochloric acid, sulfuric acid, and others.

In one embodiment, the wheat protein isolate may be treated with a reducing agent. Suitable reducing agents include, but are not limited to, sodium metabisulfite, L-cysteine, dithiothreitol ("DTT"), 2-mercaptoethanol, bisodium sulfite, or combinations of any thereof. Thus, treatment of the wheat protein isolate with an acid and/or a reducing agent may modify the tertiary structure of the gluten protein strands resulting in a more soluble protein that exhibits greater extensibility, vitality, adhesiveness, and/or reduced viscoelastic properties as compared to unmodified wheat protein isolates. A viscoelastic dough will deform and flow under the influence of an applied shear stress, but when the stress is removed, the dough will slowly recover from at least some of the deformation. The wheat protein isolate may be further characterized as a protein isolate having at least 70% protein by weight as determined by measuring nitrogen content and multiplying by 6.25. The wheat protein isolate, as described herein, may be suited for use as an egg replacement for baked goods. Various embodiments of the formulations of the easy to use composition for reducing or replacing egg and emulsifier including the wheat protein isolate will now be described in detail.

In certain applications, powders may be desirable over liquids in the food industry for various reasons. For example, powders may not contain substantial amounts of water, so they may be lighter, making them less expensive and easier to transport than liquids. Powders may also be less susceptible to spoilage than compositions including water. Powders may also be easier to handle than, for example, whole eggs, which must be separated from their shells before being added as an ingredient to a baked good mix, batter, or dough. Powders may also have advantages over solid materials and gels or pastes. For example, powders that flow freely may be easy to measure and/or scale when formulating ingredients of a baked good mix.

Certain embodiments of the composition to reduce or replace eggs and emulsifiers in baked goods may be formulated as a powder. The powders of the present disclosure may have varying bulk densities depending on whether they are compacted or aerated. The composition may be a free-flowing and easily scalable ingredient, that, when used in a baked good mix, reduces or replaces the egg and emulsifiers which themselves may comprise, for example, but not limited to, powders, liquids, gels, or syrups. Embodiments of the composition may have a uniformity index on the Carr reference table of less than about 18.

In one embodiment, a wheat protein isolate and an emulsifier may be added as separate ingredients to a baked good mix to reduce, replace or mimic egg and emulsifiers. It has been discovered that baked goods comprising wheat protein isolate and an emulsifier added as separate components may exhibit comparable, or in certain embodiments, improved physical characteristics as compared to baked goods comprising egg and emulsifiers. In another embodiment, a composition comprising a blend including wheat protein isolate and an emulsifier may be added to a baked good mix to reduce or replace egg and emulsifiers. Baked goods comprising the composition comprising a blend including a wheat protein isolate and an emulsifier may exhibit comparable or, in certain embodiments, improved physical characteristics, compared to a control baked good comprising egg and emulsifiers. In addition, baked goods comprising the composition comprising the blends may exhibit superior physical characteristics, such as, for example, but not limited to moisture, grain tightness, volume, strength, stability, and/or firmness as compared to a baked good comprising a wheat protein isolate and emulsifiers added separately. The improvement in physical characteristics in a baked good derived from the use of the composition comprising a blend including wheat protein isolate and an emulsifier compared to adding the wheat protein isolate and emulsifiers as separate ingredients is unexpected.

In certain embodiments, there may be a synergistic result from combining the components of the free-flowing composition into a blend before adding it to a baked good mix. For example, a cake mix comprising certain embodiments of the composition comprising the blend may produce a moist cake with a tight grain and increased volume compared to a cake made with wheat protein isolate and emulsifiers added as separate ingredients.

In certain embodiments, the present disclosure provides a free-flowing composition comprising a wheat protein isolate and an emulsifier. According to various embodiments, the free-flowing composition may be used to reduce or replace egg and emulsifier in a baked good mix. The wheat protein isolate may be any wheat protein isolate as described herein. In certain embodiments, the composition may comprise from 10% to 75% by weight of the wheat protein isolate. In other embodiments, the composition may comprise from 14% to 55% by weight of the wheat protein isolate. In further embodiments, the wheat protein isolate may comprise a phosphate. In still further embodiments, the wheat protein isolate may have a sulfite concentration of less than 0.001% by weight.

Further embodiments of the present disclosure may comprise a free-flowing composition as described herein that may be substantially free of egg protein. Various other embodiments may contain no egg. Egg, as set forth herein, includes eggs or egg-based products, such as, whole eggs, powdered eggs, egg whites, egg yolk, egg-based proteins, and any other constituent, derivative, or by-product of eggs, including various combinations of any of these products.

In certain embodiments, the free-flowing composition may replace substantially all of the egg and all of the emulsifier content of a baked good mix. In other embodiments, the composition may replace from 50% to 100% by weight of the egg content of a baked good mix. In still other embodiments, the free-flowing composition may replace from 1% to 50% by weight of the egg content in a baked good mix. In further embodiments, the composition may replace from 1% to 100% by weight of the emulsifiers of a baked good mix.

Food products may be a complex chemical mixture. Each ingredient in a food product may have its own unique properties that may conflict with other ingredients. When mixed together, these ingredients may not by themselves form a homogenous mixture. For example, when a polar ingredient such as water is mixed with a nonpolar ingredient such as oil, a heterogeneous mixture may form. An emulsion may be a stable or semi-stable mixture of two immiscible or unblendable substances. One component of the emulsion, the "dispersed phase", may be dispersed in the other component known as the "continuous phase." Emulsifiers, also known as emulgents or surfactants, are substances which may be capable of stabilizing a mixture of two or more immiscible ingredients, helping to achieve a homogenous mixture. A homogenous mixture may help improve the quality and consistency of certain food products by forming an emulsion. In certain embodiments of various compositions of the present disclosure, the emulsifier may comprise, for example, but not limited to, a propylene glycol ester; a lecithin; a glyceride, for example, a monoacylglyceride, a diacylglyceride, or a triacylglyceride; an interesterified vegetable oil; sodium stearol lactylate; or combinations of any thereof.

In certain embodiments, the emulsifier may comprise a propylene glycol ester. Propylene glycol is an organic compound, also known as propane-1,2-diol, having the chemical formula $C_3H_8O_2$. Propylene glycol esters are esters where one or both hydroxyl groups of the propylene glycol may be esterified, for example, by reaction with a carboxylic acid. Propylene glycol esters of the present disclosure may comprise propylene glycol mono-esters (wherein the ester may be formed with either the primary alcohol or the secondary alcohol of the propylene glycol) and propylene glycol diesters. Propylene glycol esters may be esters of, for example, but not limited to, fatty acids. Propylene glycol esters of fatty acids may be mixtures of propylene glycol mono- and diesters of saturated and unsaturated fatty acids derived from edible oils and fats. The products may be produced either by direct esterification of propylene glycol with fatty acids or by transesterification of propylene glycol with oils or fats.

In other embodiments, the emulsifier may comprise an acylglyceride. Glycerol has three hydroxyl functional groups which can be esterified with one, two, or three fatty acids to form monoacylglycerides, diacylglycerides and triacylglycerides, respectively. Certain embodiments of the disclosure may comprise a monoacylglyceride, a diacylglyceride, a triacylglyceride, or combinations of any thereof. Vegetable oils and animal fats contain mostly triacylglycerides, but may be broken down, for example, by chemical reaction or by natural enzymes (such as lipases), into mono- and diacylglycerides and free fatty acids. Examples of vegetable oils containing glycerides include, but not limited to, corn oil, peanut oil, safflower oil, sunflower oils, and soybean oil. Diacylglyceride (DAG) include two fatty acids esterified onto the glycerol backbone in either the 1,3-configuration or the 1,2-configuration. DAG oil may be naturally occurring or may be made by a chemical or enzymatic process. Certain DAG oils may contain greater than 80% diacylglycerides, with approximately 15% triacylglycerides, 1% monoacylglycerides and less than 1% emulsifiers (polyglycerol esters of fatty acids). Examples of commercially available DAG oils include, but are not limited to, ENOVA® brand DAG oil (commercially available from ADM Kao LLC, Decatur, Ill.) and ECONA® brand DAG oil (commercially available from Kao Corp., Tokyo, Japan), which are highly unsaturated edible oils made from all natural soybean and canola oil. ENOVA® brand oil contains greater than 80% diacylglycerides. The diacylglycerides may be esterified with predominantly unsaturated fatty acids, including, for example, oleic, linoleic and linolenic fatty acids. Diacylglycerides (including, for example, DAG oils) may be produced in several ways. For example and without limitation, DAG oils may be prepared either by interesterifying an oil or fat with glycerol or by di-esterifying glycerol with two fatty acids.

According to other embodiments, the emulsifier may comprise a lecithin. Lecithin may be primarily a mixture of glycolipids, triacylglycerides, and/or phospholipids (e.g. phosphatidylcholine, phosphatidylethanolamine, and phosphatidylinositol). Commercial lecithin, such as that used by food manufacturers, may comprise a mixture of phospholipids in oil. Lecithin may be obtained from, for example, but not limited to, soybeans, corn, sunflower seeds, canola and/or egg yolk. Commercial lecithin may be a mixture of various phospholipids, and the compositions may depend on the origin of the lecithin. One source of lecithin is soybean oil. The phospholipids in lecithin from soy and sunflower include phosphatidyl choline, phosphatidyl inositol, phosphatidyl ethanolamine and/or phosphatidic acid. They are often abbreviated to PC, PI, PE and PA, respectively. To modify the performance of lecithins, i.e., to make it suitable for the product to which it is added, the lecithin may be hydrolyzed enzymatically. In hydrolyzed lecithins, a portion of the phospholipids have one fatty acid removed by a chemical hydrolysis or an enzyme, such as a phospholipase. Such phospholipids are known as lyso-phospholipids. De-oiled lecithin may have a majority of the triglycerides and fatty acids removed, and may form a powder or granular substance.

Interesterified oils are oils that have been chemically modified. This may be done in order to make them more solid, less liable to go rancid and/or more stable for applications such as deep frying. In a polyunsaturated fat, one or more polyunsaturated fatty acids (PUFA) may be esterified to a glycerol backbone. Interesterification may be used to replace the PUFA with a saturated fatty acid, typically stearic acid. The process may be applied to natural oils or fats, or hydrogenated or fractionated oils. Interesterification may be induced by chemicals or enzymatic catalysts. The interesterified fats may be separated through controlled crystallization. Interesterification does not introduce trans fatty acids. However, the resulting fat may be subtly different than natural oils. In certain polyunsaturated fats, the PUFA is commonly found at the middle position (sn2) on the glycerol.

Commercial grade stearoyl lactylate salts, such as, for example, sodium and calcium salts, encompass a variety of lactylates including those having a wide range of lactyl groups and various fatty acids taken from the acyl group. For example, the stearoyl lactylate salts are generally written as sodium stearoyl-m-lactylate and calcium stearoyl-n-lactylate wherein m and n represent the average number of lactyl groups (polylactyls) present, that is, each m and n represents an average of a range which may extend from 0 to 11 when used as baking additives. Stearol lactylate salts are understood to include as the wide range of lactyl groups and various fatty acids substitutions for stearic acid which may be present in commercial stearoyl lactylate salts. Sodium stearoyl lactate (and the similar calcium stearoyl lactate) may be made by combining lactic acid and stearic acid, and reacting the product with sodium hydroxide or calcium hydroxide to make the sodium or calcium salt.

According to certain embodiments, the free-flowing composition may comprise from 1% to 60% by weight of the emulsifier. In other embodiments, the free-flowing composition may comprise from 25% to 55% by weight of the emulsifier. In still other embodiments, the free-flowing composition may comprise from 15% to 25% by weight of the emulsifier. The emulsifier may be any emulsifier as set forth herein, such as, for example, a propylene glycol ester; a lecithin; an acylglyceride, for example, a monoacylglyceride, a diacylglyceride, or a triacylglyceride; an interesterified vegetable oil; sodium stearol lactylate; or combinations of any thereof.

The physical properties of food and food ingredients may be important in food and food production. For certain applications, ingredients may be required to flow freely and not agglomerate. Left to themselves, many foods may tend to coagulate and flow agents may be utilized to prevent this. In certain embodiments of the present disclosure, the free-flowing composition may further comprise a flow agent. Examples of flow agents suitable for use in various embodiments include, but are not limited to, silicon dioxide, calcium stearate, magnesium stearate, maltodextrin, shellac, kaolin, kaolinite, calcium phosphate, tricalcium phosphate, sodium bicarbonate, potassium bicarbonate, sodium ferrocyanide, powdered cellulose, silicate, stearic acid and salts thereof, talcum, a starch, or combinations of any thereof. In other embodiments, the flow agent may comprise silicon dioxide. In certain embodiments, the composition may comprise from 1% to 30% by weight of the flow agent. In other embodiments, the composition may comprise from 14% to 25% by weight of the flow agent. In still other embodiments, the composition may comprise from 15% to 20% by weight of the flow agent. In one embodiment, the composition may comprise 15% by weight of the flow agent.

Gluten is an amorphous mixture of ergastic proteins found combined with starch in the endosperm of some cereals, for example, but not limited to, wheat, rye, and barley. Certain embodiments of the present disclosure may further comprise a gluten. Other embodiments may comprise a wheat gluten. Certain embodiments may comprise from 1% to 75% by weight of a gluten. Other embodiments may comprise from 30% to 60% by weight of a gluten.

In certain embodiments, the food product, as described herein, may comprise one or more additional ingredients. According to various embodiments, the food product may comprise at least one additional ingredients such as, but not limited to, an acidulant, a starch, a wheat gluten, a release agent, a leavening agent, a vitamin, a mineral, a plant sterol, a lignan extract, fructose, dextrose, molasses, honey, malt, high fructose corn syrup, a fruit piece, a dried fruit piece, a polyol, a protein isolate, a protein concentrate, a flour, a vegetable oil, a chocolate piece, a chocolate coating, cocoa powder, a wafer, a crisp, a digestion resistant soluble fiber, a sweetener, an artificial sweetener, a gum, or combinations of any thereof.

According to certain embodiments, the free-flowing composition, as described herein, may be incorporated into a food product. The food product may include, but is not limited to, a cake, a cookie, a brownie, a muffin, a bread, a donut, a crust, a pastry, a cracker, a desert bar, a pancake, a waffle, and a bagel. Thus, certain embodiments of the present disclosure include a food product comprising any of the various embodiments of the compositions disclosed herein.

According to various embodiments, the composition may comprise a wheat protein isolate, a propylene glycol ester, a glyceride, and a lecithin. Still other embodiments may comprise from 25% to 55% by weight of a wheat protein isolate, from 14% to 24% by weight of a propylene glycol ester, from 14% to 24% by weight of a glyceride, and from 1% to 3% by weight of a lecithin. Examples of propylene glycol esters, glycerides, and lecithin suitable for use in certain embodiments are set forth herein.

According to other embodiments, the compositions described herein may be in the form of a free-flowing powder. The free-flowing nature of a composition may be measured, for example, by a flowability index. Further embodiments of the compositions may comprise a composition forming a powder having a flowabilty index of less than about 18 on a Carr Reference Table.

Other embodiments of the present disclosure include processes for producing a food composition. According to certain embodiments, the process for producing a food composition may comprise combining a wheat protein isolate and an emulsifier to form a free-flowing mixture. Certain embodiments of the processes may further comprise mixing the free-flowing mixture with a flour. Other embodiments of the processes may further comprise mixing the free-flowing mixture with a flour and water to form a dough or a batter.

According to various embodiments of the processes described herein, the emulsifier may comprise a propylene glycol ester, a lecithin, a monoacylglyceride, a diacylglyceride, a triacylglyceride, an interesterified vegetable oil, sodium stearol lactylate, or combinations of any thereof.

According to other embodiments, the processes may further comprise combining a flow agent with the wheat protein isolate and the emulsifier to form a free-flowing mixture. In certain embodiments, the composition may have a uniformity index on the Carr reference table of less than about 18.

According to certain embodiments, combining the wheat protein isolate and the emulsifier to form a free-flowing mixture may further comprise preparing the wheat protein isolate as a dry mix, preparing an emulsifier as a liquid portion, and combining the dry mix with the liquid portion, thus forming the free-flowing mixture. According to certain embodiments, the dry mixture comprises components that may be dry or powders, and substantially free of liquid components. The liquid portion may comprise the components of the invention that may be liquids, gels, or pastes. In other embodiments, the processes may further comprise adding a flow agent to the dry mix.

Generally, in certain embodiments, the composition may be prepared by first blending a wheat protein isolate and a flow agent to form a dry mix. A liquid portion may be formed by heating and mixing at last one emulsifier to a temperature from 145° F. to 150° F. The color of the finished product may be darkened at temperatures above 150° F., and at temperatures below 130° F., the liquid portion may be difficult to process. The liquid portion may be sprayed onto the dry mix while the dry mix is being blended. The liquid may become bound to the dry mix to form a free-flowing mixture. Further embodiments of the processes of the present disclosure may comprise passing the free-flowing mixture through a mesh screen.

In certain embodiments, the processes may further comprise placing the free-flowing mixture in a container with at least one ingredient to form a baked good mix. Suitable examples of a baked good mix may include, for example, but not limited to, a cake mix, a cookie mix, a brownie mix, a muffin mix, a bread mix, a bread dough, a donut mix, a donut batter, a crust mix, a pastry mix, a cracker mix, a desert bar mix, a pancake mix, a waffle mix, a batter mix, a bagel mix, and a bagel dough. Suitable examples of the at least one ingredient may include, for example, but not limited to, baking soda, water, an acidulant, a starch, a wheat gluten, a release agent, a leavening agent, a vitamin, a mineral, a plant sterol, a lignan extract, fructose, dextrose, molasses, honey, malt, high fructose corn syrup, a fruit piece, a dried fruit piece, a polyol, a protein isolate, a protein concentrate, a flour, a vegetable oil, a chocolate piece, a chocolate coating, a wafer, a crisp, a digestion resistant soluble fiber, a sweetener, an artificial sweetener, a gum, or combinations of any thereof.

According to certain embodiments, the processes of the present disclosure may further comprise producing a wheat protein isolate. The wheat protein isolate may be produced by a process as described herein, such as, a process comprising treating a wheat gluten with an acid and/or a reducing agent, wherein the wheat protein isolate has reduced viscoelastic properties as compared to a wheat protein isolate that has not been treated with the acid and/or the reducing agent.

Other embodiments of the present disclosure may be directed to a system comprising a first composition comprising a protein isolate and a second composition comprising an emulsifier. According to certain embodiments, the protein isolate may comprise a wheat protein isolate, such as any of the wheat protein isolates described herein.

The systems according to certain embodiments of the present disclosure may further comprise indicia associated therewith. The indicia may, for example, be capable of directing a user of the system on how to incorporate the first composition and the second composition into a food product.

In certain embodiments of the present disclosure, the free-flowing composition described herein may comprise one or more additional food proteins. Many food proteins may be suitable for use in the various embodiments of compositions which comprise one or more additional food proteins. For example, the following additional food proteins may be used as a component in certain embodiments: milk protein, caseinate, whey protein, buttermilk solids, milk powders, egg protein, gelatin, soy protein, canola protein, pea protein, wheat protein, potato protein, corn protein, sesame protein, sunflower protein, cottonseed protein, copra protein, palm kernel protein, safflower protein, linseed protein, peanut protein, lupin protein, edible bean protein, oat protein, isolates of any thereof, concentrates of any thereof, or combinations of any thereof.

In other embodiments of the present disclosure, the free-flowing composition may further comprise an enzyme, such as, for example, but not limited to an amylase, a proteases, trypsin, a glucanase, betaglucosidase, amyloglucosidase, rennin, glucoamylases, glucose isomerase, and combinations of any thereof.

Certain embodiments comprise a composition consisting essentially of a wheat protein isolate, a flow agent, and an emulsifier selected from the group consisting of a propylene glycol monoester, a monoacylglyceride, a lecithin, and combinations of any thereof. In other embodiments, the wheat protein isolate comprises a phosphate. In still other embodiments, the wheat protein isolate comprises an organic acid and is substantially free of sulfites. Further embodiments may have flowability index on the Carr Reference Table of less than about 18. In certain embodiments, the emulsifier may comprise a lecithin. In other embodiments, the wheat protein isolate may have a protein content of at least 70%.

Other embodiments comprise a food product comprising a composition consisting essentially of a wheat protein isolate, a flow agent, and an emulsifier selected from the group consisting of a propylene glycol monoester, a monoacylglyceride, a lecithin, and combinations of any thereof.

Certain embodiments comprise a container comprising a composition consisting essentially of a wheat protein isolate, a flow agent, and an emulsifier selected from the group consisting of a propylene glycol monoester, a monoacylglyceride, a lecithin, and combinations of any thereof.

Various embodiments of the present disclosure will be better understood when read in conjunction with the following Examples. The procedures set forth in the Examples below are not intended to be limiting herein, as those skilled in the art will appreciate that various modifications to the procedures set forth in the Examples, as well as to other procedures not described in the Examples, may be useful in practicing the invention as described herein and set forth in the claims.

EXAMPLES

Example 1

Egg Replacement and Emulsifier System

This example illustrates a formulation of an egg replacement/mimicking and emulsifier system comprising a wheat protein isolate, emulsifiers, and a flow agent, to produce a free-flowing composition that functions as an emulsifier and replaces at least a portion of egg in a baked good mix. This formulation produced a system that is dry, free-flowing, and easily scalable. The egg replacement and emulsifier system was used to reduce or replace at least a portion of the egg and emulsifier, for example, in the manufacture of a cake or a cookie. The formulation of the composition is presented in Table 1.

TABLE 1

Formulation of One Embodiment of a Free-Flowing Composition

| Component | Percent (by weight) |
| --- | --- |
| Wheat protein isolate | 25% |
| Silicon dioxide | 25% |
| Propylene glycol monoester (PGME) | 24% |
| Mono and diacylglycerides | 24% |
| Lecithin | 2% |

The wheat protein isolate and silicon dioxide were blended together to form a uniform dry blend mixture. The mixture was "hold" blended until the liquid portion was heated to provide a uniform mixture and ensure that the ingredients did not separate. The PGME, glycerides, and lecithin were added to a heated mix tank, heated to a temperature ranging from 145° F. to 150° F. and mixed to form a uniform liquid mixture. The heated liquid portion was sprayed onto the agitating dry ingredients in the blender, with special care to uniformly disperse the liquid. The liquid portion became bound to the dry ingredients forming a dry, free-flowing mixture.

Example 2

Egg Replacement and Emulsifier System

In this example, a free-flowing composition comprising a wheat protein isolate, emulsifiers, and a flow agent was prepared. The composition was used as a single ingredient to act as an emulsifier and to replace a portion of the egg in the yellow sheet cake. The formulation produced a system that was dry, free-flowing, and easily scalable. The composition of the egg replacement and emulsifier system is presented in Table 2.

TABLE 2

Formulations of Free-Flowing Compositions Used in Yellow Cake

| Component | Percent (by weight) |
|---|---|
| Wheat protein isolate | 55.54% |
| Silicon dioxide | 14.91% |
| Propylene glycol monoester | 14.14% |
| Mono and diacylglycerides | 14.14% |
| Lecithin | 1.27% |

The wheat protein isolate and silicon dioxide were blended together to form a uniform dry blend mixture. The mixture was "hold" blended until the liquid portion was heated to provide a uniform mixture and ensure that the ingredients did not separate. The PGME, glycerides, and lecithin were added to a heated mix tank, heated to a temperature ranging from 145° F. to 150° F. and mixed to form a uniform liquid mixture. The heated liquid portion was sprayed onto the agitating dry ingredients in the blender, with special care to uniformly disperse the liquid. The liquid portion became bound to the dry ingredients forming a dry, free-flowing mixture.

Example 3

Yellow Sheet Cake Formulation

In this Example, yellow sheet cakes were prepared using a control cake mix and a cake mix prepared using the free-flowing composition prepared in Example 2 (composition 1). The formulation using the embodiment of the present disclosure was compared to a control formulation comprising eggs and emulsifiers comprising monoacylglycerides and propylene glycol monoester. Table 3 presents the ingredients of the control formulation for a yellow sheet cake and the formulation including the composition of Example 2 for yellow sheet cake.

TABLE 3

Ingredients for Yellow Sheet Cake

| | Control | | Composition 1 | |
|---|---|---|---|---|
| Ingredients | Total (grams) | wt % | Total (grams) | wt % |
| Flour | 350 | 21.94 | 350 | 21.94 |
| Sugar | 420 | 26.33 | 420 | 26.33 |
| Water | 520 | 32.60 | 520 | 32.60 |
| Non Fat Dry Milk | 44 | 2.76 | 44 | 2.76 |
| Baking Powder | 22 | 1.38 | 22 | 1.38 |
| Salt | 11 | 0.69 | 11 | 0.69 |
| Whole Dried Eggs | 70 | 4.39 | 35 | 2.19 |
| Cake Shortening | 130 | 8.15 | 130 | 8.15 |
| Emulsifiers | 28 | 1.76 | 0 | 0 |
| Free flowing composition (Example 2) | 0 | 0 | 63 | 3.95 |
| TOTAL | 1595 | | 1595 | |

The emulsifier used in the formulation was a blend of propylene glycol mono- and di-esters of fats and fatty acids, mono- and diglycerides and lecithin on silicon dioxide carrier.

Both cakes were made by the following procedure. The dry ingredients were creamed with shortening for five minutes. 320 grams of water was added to the mix, which was mixed for one minute on low scrape and mixed on low for four minutes. Over the span of one minute, an additional 200 grams of water was added while being mixed on low, and the mix was mixed on high speed for four minutes. The mix was mixed for two minutes on low while batter temperature and specific gravity were tested, and then 400 grams of the mix was added to an eight-inch pan and baked at 380° F. for 25 minutes. The formulation made with an embodiment of the egg replacement and emulsifier system produced a moist cake comparable to the control.

Example 4

Cake Formulations

In this example, various formulations for a cake were prepared using one example of the free-flowing composition described herein. Some of the formulations (2-5, 7) were prepared with the free-flowing system of Example 2 and were compared to a control formulation (1) comprising eggs and emulsifiers comprising monoacylglyceride and propylene glycol monoester, and another embodiment (6) with none of the free-flowing system of Example 2 and half of the egg content of the control. Table 4 presents the ingredients of the control formulation and the test formulations.

TABLE 4

Ingredients for Sample Cakes

| | #1 | | #2 | | #3 | | #4 | | #5 | | #6 | | #7 | |
|---|---|---|---|---|---|---|---|---|---|---|---|---|---|---|
| INGREDIENT | Total (grams) | wt % | Total (grams) | wt % | Total (grams) | wt % | Total (grams) | wt % | Total (grams) | wt % | Total (grams) | wt % | Total (grams) | wt % |
| cake flour | 350 | 21.88 | 350 | 21.88 | 350 | 21.78 | 350 | 21.97 | 350 | 22.44 | 350 | 24.36 | 225 | 24.43 |
| sugar | 420 | 26.25 | 420 | 26.25 | 420 | 26.14 | 420 | 26.37 | 420 | 26.92 | 420 | 29.23 | 270 | 29.32 |
| cake shortening | 130 | 8.13 | 130 | 8.13 | 130 | 8.09 | 130 | 8.16 | 90 | 5.77 | 130 | 9.05 | 84 | 9.12 |
| non fat dry milk | 44 | 2.75 | 44 | 2.75 | 44 | 2.74 | 44 | 2.76 | 44 | 2.82 | 44 | 3.06 | 28 | 3.04 |

TABLE 4-continued

| | #1 | | #2 | | #3 | | #4 | | #5 | | #6 | | #7 | |
|---|---|---|---|---|---|---|---|---|---|---|---|---|---|---|
| INGREDIENT | Total (grams) | wt % | Total (grams) | wt % | Total (grams) | wt % | Total (grams) | wt % | Total (grams) | wt % | Total (grams) | wt % | Total (grams) | wt % |
| baking powder | 22 | 1.38 | 22 | 1.38 | 22 | 1.37 | 22 | 1.38 | 22 | 1.41 | 22 | 1.53 | 14 | 1.52 |
| salt | 11 | 0.69 | 11 | 0.69 | 11 | 0.68 | 11 | 0.69 | 11 | 0.71 | 11 | 0.77 | 7 | 0.76 |
| water | 525 | 32.81 | 525 | 32.81 | 525 | 32.67 | 525 | 32.96 | 525 | 33.65 | 425 | 29.58 | 250 | 27.14 |
| whole dried eggs | 70 | 4.38 | 35 | 2.19 | 42 | 2.61 | 28 | 1.76 | 35 | 2.24 | 35 | 2.44 | 0 | 0.00 |
| emulsifiers | 28 | 1.75 | 0 | 0.00 | 0 | 0.00 | 0 | 0.00 | 0 | 0.00 | 0 | 0.00 | 0 | 0.00 |
| free-flowing composition | 0 | 0.00 | 63 | 3.94 | 63 | 3.92 | 63 | 3.95 | 63 | 4.04 | 0 | 0.00 | 43 | 4.67 |
| TOTAL | 1600 | | 1600 | | 1607 | | 1593 | | 1560 | | 1437 | | 921 | |

The emulsifier used in the formulation was a blend of propylene glycol mono- and di-esters of fats and fatty acids, mono- and diglycerides and lecithin on silicon dioxide carrier.

The cakes were prepared according to the procedure of Example 3. All formulations comprising the free-flowing composition produced a moist, tender cake, with a good grain, comparable to the control cake #1. Cake #6 had a 50% reduction in egg and no free-flowing composition was added. This cake fell apart. In cakes #2-5, some of the egg was replaced by a embodiment of the composition added as a single ingredient to the baked good mix. Cake #2 replaced 50% of the egg compared to the control with the free-flowing composition, and produced a slightly lower volume cake than the control, but produced a nice cake, slightly tender, with whiter color crumbs with fine grain. Cake #3 used 50% as much of the free-flowing mixture as the control, but reduced the egg by only 40% instead of 50%. Good results were obtained with nice volume, good appearance, and very white crumbs. Cake #4 used 50% as much of the free-flowing mixture as the control, but reduced the egg by 60% instead of 50%. The cake came out very tender, but the grain and appearance were very good. Cake #5 replaced 50% of the egg the free-flowing composition, and reduced the fat by 30%. The volume was lower and the outside color was pale, but the grain was very good. Cake #7 produced a tender cake, but was very weak.

Example 5

Cookie Formulation

In this Example, formulations for a cookie using differing amounts of the composition according to one embodiment of the present disclosure were prepared and the resulting cookie was compared to a control cookie prepared using an egg protein. The free-flowing composition was used as a replacement of 25%, 40% and 50% of the egg protein. The formulations were prepared according to Table 5.

TABLE 5

Ingredients for Sample Cookies

| Ingredient | A: Control | | B: 25% Replacement | | C: 40% Replacement | | D: 25% Replacement | | E: 40% Replacement | | F: 25% Replacement | | G: 50% Replacement | |
|---|---|---|---|---|---|---|---|---|---|---|---|---|---|---|
| | Grams | Percent | Grams | Percent | Grams | Percent | Grams | Percent | Grams | Percent | Grams | Percent | Grams | Percent |
| Bleached Pastry Flour | 129.3 | 32.33 | 129.3 | 32.33 | 129.3 | 32.33 | 129.3 | 32.33 | 129.31 | 32.33 | 129.3 | 32.33 | 129.3 | 32.33 |
| Granulated Sugar | 21.8 | 5.45 | 21.8 | 5.45 | 21.8 | 5.45 | 21.8 | 5.45 | 21.8 | 5.45 | 21.8 | 5.45 | 21.8 | 5.45 |
| Light Brown Sugar | 43.56 | 10.89 | 43.56 | 10.89 | 43.56 | 10.89 | 43.56 | 10.89 | 43.56 | 10.89 | 43.56 | 10.89 | 43.56 | 10.89 |
| Maltitol Syrup | 7.76 | 1.94 | 7.76 | 1.94 | 7.76 | 1.94 | 7.76 | 1.94 | 7.76 | 1.94 | 7.76 | 1.94 | 7.76 | 1.94 |
| 62 DE Corn Syrup | 16.33 | 4.08 | 16.33 | 4.08 | 16.33 | 4.08 | 16.33 | 4.08 | 16.33 | 4.08 | 16.33 | 4.08 | 16.33 | 4.08 |
| Salt | 1.8 | .45 | 1.8 | .45 | 1.8 | .45 | 1.8 | .45 | 1.8 | .45 | 1.8 | .45 | 1.8 | .45 |
| Baking Soda | 1.8 | .45 | 1.8 | .45 | 1.8 | .45 | 1.8 | .45 | 1.8 | .45 | 1.8 | .45 | 1.8 | .45 |
| Unsalted Butter | 29.04 | 7.26 | 29.04 | 7.26 | 29.04 | 7.26 | 29.04 | 7.26 | 29.04 | 7.26 | 29.04 | 7.26 | 29.04 | 7.26 |
| Interesterified Oil | 29.04 | 7.26 | 29.04 | 7.26 | 29.04 | 7.26 | 29.04 | 7.26 | 29.04 | 7.26 | 29.04 | 7.26 | 29.04 | 7.26 |
| Whole Egg Powder | 7.76 | 1.94 | 5.82 | 1.46 | 4.67 | 1.17 | 5.84 | 1.46 | 4.67 | 1.17 | 5.82 | 1.46 | 3.89 | .97 |
| Wheat Protein Isolate | | | 1.5 | .37 | 2.48 | .62 | 1.46 | .36 | 2.33 | .58 | | | | |
| De-oiled Lecithin | | | .4 | .1 | .63 | .16 | | | | | | | | |
| Emulsifier Powder | | | | | | | .48 | .12 | .78 | .19 | | | | |

TABLE 5-continued

Ingredients for Sample Cookies

| Ingredient | A: Control Grams | A: Control Percent | B: 25% Replacement Grams | B: 25% Replacement Percent | C: 40% Replacement Grams | C: 40% Replacement Percent | D: 25% Replacement Grams | D: 25% Replacement Percent | E: 40% Replacement Grams | E: 40% Replacement Percent | F: 25% Replacement Grams | F: 25% Replacement Percent | G: 50% Replacement Grams | G: 50% Replacement Percent |
|---|---|---|---|---|---|---|---|---|---|---|---|---|---|---|
| PGME, Monoacylglyceride, and Wheat Protein Isolate Mix (Free flowing composition) | | | | | | | | | | | 1.94 | .48 | 3.89 | .97 |
| Water | 23.34 | 5.83 | 23.34 | 5.83 | 23.33 | 5.86 | 23.34 | 5.83 | 23.33 | 5.83 | 23.34 | 5.83 | 23.34 | 5.83 |
| Chocolate Chips | 87.12 | 21.79 | 87.12 | 21.79 | 87.12 | 21.79 | 87.12 | 21.79 | 87.12 | 21.79 | 87.12 | 21.79 | 87.12 | 21.79 |
| Butter and Vanilla Flavor | 1.28 | .32 | 1.27 | .32 | 1.27 | .32 | 1.27 | .32 | 1.27 | .32 | 1.27 | .32 | 1.27 | .32 |
| Vanillin | .04 | .01 | .04 | .01 | .04 | .01 | .04 | .01 | .04 | .01 | .04 | .01 | .04 | .01 |
| Total | 400 | 100 | 400 | 100 | 400 | 400 | 400 | 100 | 400 | 100 | 400 | 100 | 400 | 100 |

The emulsifier used in the formulation was a blend of propylene glycol monostearate, mono- and diglycerides, mid-oleic sunflower oil, sodium stearoyl lactylate, and hydroxylated soy lecithin on a silicon dioxide carrier.

All cookies made using the embodiments of egg replacement and emulsifier system produced cookies comparable to the control cookie in terms of volume, cookie hardness, and featured a soft middle.

Example 6

Eggless Cake Formulation

In this Example, a formulation for an eggless cake was prepared using the free-flowing composition according to one embodiment of the present disclosure. The formulation was prepared according to Table 6 below.

TABLE 6

Ingredients for Eggless Cake

| Ingredients | Bakers % |
|---|---|
| Sugar | 120 |
| Flour | 100 |
| Salt | 3 |
| Baking Powder | 8 |
| Non-fat dry milk (NFDM) | 12.5 |
| Shortening | 25 |
| PGME and Monoacylglyceride | 15 |
| Wheat protein isolate | 15 |
| Guar Gum | 0.2 |
| Water | 140 |

All ingredients except water were blended on low for 4 minutes. Half of the water was added to the blend with mixing over a 1 minute period and the bowl was scraped. The mixture was blended on medium speed for an additional 4 minutes. The remaining water was added to the mixture over a 1 minute period and the bowl was scraped. The mixture was blended on medium for an additional 3 minutes and the batter was poured into an 8 inch round cake pan and baked at 380° F. for 30 minutes. This formulation produced a tender, cake with good volume.

Example 7

Process of Preparing an Egg Replacement and Emulsifier System

In this Example, a free-flowing composition of Example 2 comprising a wheat protein isolate, silicon dioxide, propylene glycol monostearate, mono- and diacylglycerides, and lecithin was produced. The wheat protein isolate and silicon dioxide were blended together to form a uniform dry blend mixture. The mixture was "hold" blended to provide a uniform mixture and ensure that the ingredients did not separate until the liquid portion was heated. The PGME, glycerides, and lecithin were added to a heated mix tank, heated to a temperature ranging from 145° F. to 150° F. and mixed to form a uniform liquid mixture. The heated liquid portion was sprayed onto the agitating dry ingredients in the blender, with special care to uniformly disperse the liquid. The liquid portion became bound to the dry ingredients forming a dry, free-flowing mixture. The mix is blended well and screened through a 20 mesh screen to ensure a lump-free system.

Example 8

Flowability Data of a Embodiment of the Invention

In this Example, one embodiment of the composition (Example 2) was tested in order to characterize the composition's flowability. Table 7 below lists the powder analysis results. Table 8 below is a Carr table for evaluating flow properties.

TABLE 7

Powder Analysis Results

| | |
|---|---|
| Angle of Repose | 49.5 (I = 12) |
| Angle of Fall | 42.9 (I = 12) |
| Angle of Difference | 6.6 (I = 6.6) |
| Aerated Bulk Density | 0.451 g/cc |
| Packed Bulk Density | 0.669 g/cc |
| Compressibility | 32.6% (I = 7) |
| Angle of Spatula | 70.7 deg |
| Angle of Fall | 61.0 deg |
| Uniformity Index | 12.0 (I = 17.5) |

(I = Index for Carr's Reference Tables)

TABLE 8

| Loose Bulk Density | | Compressibility | | Uniformity Index | | Cohesion Index | | FFI | Flow Property Verbal |
|---|---|---|---|---|---|---|---|---|---|
| Grad | Index | % | Index | % | Index | % | Index | Index | Description |
| <25 | 34 | <5 | 33 | 1 | 33 | | | 90-100 | Best |
| 26-29 | 32 | 6-9 | 31.5 | 2-4 | 31.5 | | | | Better |
| 30 | 30 | 10 | 30 | 5 | 30 | | | | To |
| 31 | 29 | 11 | 29 | 6 | 29 | | | 60-89 | Good |
| 32-44 | 25 | 12-24 | 25 | 11.5 | 25 | | | | To |
| 45 | 20 | 25 | 20 | 17 | 20 | | | | Normal |
| 46 | 19.5 | 26 | 19.5 | 18 | 19.5 | 6-9 | 19.5 | 20-59 | Bad |
| 47-64 | 13.5 | 27-36 | 13.5 | 19-26 | 13.5 | 10-54 | 13.5 | | To |
| 65 | 7 | 37 | 7 | 27 | 7 | 55 | 7 | | Very Bad |

Table for Evaluation of the Flow Properties, Carr, R. Evaluating Flow Properties of Solids. Chemical Engineering, 72(1965), 163-168

Example 9

Egg Replacement and Emulsifier System

This example illustrates a formulation of an egg replacement and emulsifier system comprising a wheat gluten, wheat protein isolate, emulsifiers, and a flow agent, to produce a free-flowing composition that functions as an emulsifier and replaces at least a portion of egg in a baked good mix. This formulation produced a system that is dry, free-flowing, and easily scalable. The egg replacement and emulsifier system was used to reduce or replace at least a portion of the egg and emulsifier, for example, in the manufacture of a cake or a cookie. In some cases, this system was able to replace 100% of the egg in a baked good. The formulation of the composition is presented in Table 9.

TABLE 9

Formulation of One Embodiment of a Free-Flowing Composition

| Component | Amount (%) |
|---|---|
| Wheat Gluten | 57.14% |
| Wheat Protein Isolate | 14.29% |
| Silicon Dioxide | 9.58% |
| PGME | 9.09% |
| Mono-diglycerides | 9.09% |
| Lecithin | 0.81% |

The wheat gluten, wheat protein isolate and silicon dioxide were blended together to form a uniform dry blend mixture. The mixture was "hold" blended to provide a uniform mixture and ensure that the ingredients did not separate until the liquid portion was heated. The PGME, glycerides, and lecithin were added to a heated mix tank, heated to a temperature ranging from 145° F. to 150° F. and mixed to form a uniform liquid mixture. The heated liquid portion was sprayed onto the agitating dry ingredients in the blender, with special care to uniformly disperse the liquid. The liquid portion became bound to the dry ingredients forming a dry, free-flowing mixture.

Example 10

Egg Replacement and Emulsifier System in Muffins

In this Example, muffins were prepared using the free-flowing composition prepared in Example 9. In this example, 100% of the egg was replaced. Table 10 presents the ingredients of the control formulation and the formulation including the composition of Example 9.

TABLE 10

Ingredients for Muffins

| Ingredient | #1 (grams) | #2 (grams) |
|---|---|---|
| Pastry Flour | 300 | 300 |
| Sugar | 90 | 150 |
| Baking Powder | 18 | 18 |
| Salt | 3.75 | 6 |
| Free-flowing Composition (Example 9) | 60 | 60 |
| NFDM | 30 | 15 |
| Butter | 90 | 120 |
| Dry Molasses | — | 6 |
| Dry Honey | — | 12 |
| Water | 300 | 450 |

The first formulation came out after baking similar to bread with a light crust on the top. The second formulation came out much better.

Example 11

Egg Replacement and Emulsifier System in Cookies

In this Example, cookies were prepared using a control mix and using the free-flowing composition prepared in Example 9. In this example, 100% of the egg was replaced. Table 11 presents the ingredients of the formulations including the composition of Example 9.

TABLE 11

Ingredients for Cookies

| Ingredient | #1 (grams) | #2 (grams) |
|---|---|---|
| Sugar | 256 | 240 |
| Molasses | 14 | 20 |
| Margarine | 145 | 130 |
| Shortening | 145 | 130 |
| Free-flowing Composition (Example 9) | 25 | 20 |
| Sugar | 40 | 30 |
| Vanilla | 1 | 1 |
| Water | 70 | 70 |
| Pastry Flour | 400 | 400 |
| Baking Powder | 7 | 8 |
| Sodium Bicarbonate | 3.5 | 3 |
| Chocolate Chips | 220 | 200 |

The first formulation came out very tender and made good cookies. The second formulation came out better with a slightly darker color.

Example 12

Egg Replacement and Emulsifier System in Brownies

In this Example, brownies were prepared using the free-flowing composition prepared in Example 9. In this example, 100% of the egg was replaced. Table 12 presents the ingredients of the formulations including the composition of Example 9.

TABLE 12

Ingredients for Brownies

| Ingredient | #1 (grams) | #2 (grams) | #3 (grams) | #4 (grams) |
|---|---|---|---|---|
| Sugar | 280 | 260 | 290 | 290 |
| Cocoa Dutch | 90 | 80 | 75 | 75 |
| NFDM | 8 | 10 | 15 | 15 |
| Salt | 8 | 8 | 8 | 8 |
| Margarine | 65 | 70 | 75 | 75 |
| Cake Shortening | 65 | 70 | 75 | 75 |
| Vanilla | 2 | 2 | 2 | 2 |
| Free-flowing Composition (Example 9) | 125 | 80 | 60 | 70 |
| Cake Flour | 200 | 200 | 200 | 200 |
| Corn Syrup | 150 | 110 | 140 | 140 |
| Hot Water | 100 | 70 | 80 | 80 |

The first formulation made good brownies. The second formulation also made good brownies, but the brownies were slightly dry. The third formulation made good brownies with a lower volume. The fourth formulation made the best brownies in volume and taste, comparing favorably to brownies made from eggs, but otherwise with the same formula.

Example 13

Egg Replacement and Emulsifier System in Muffins

In this Example, muffins were prepared using the free-flowing composition prepared in Example 9. In this example, 100% of the egg was replaced. Table 13 presents the ingredients of the formulations including the composition of Example 9.

TABLE 13

Ingredients for Muffins

| Ingredient | Bran (grams) | Oat (grams) |
|---|---|---|
| Sugar | 125 | 150 |
| Liquid Molasses | 50 | 50 |
| Soybean Oil | 80 | 75 |
| Water | 370 | 380 |
| Bread Flour | 200 | 200 |
| Wheat Bran | 82 | 85 |
| NFDM | 35 | 35 |
| Baking Powder | 10 | 10 |
| Free-flowing Composition (Example 9) | 50 | 50 |
| Salt | 7 | 7 |
| Sodium Bicarbonate | 6 | 7 |
| Liquid Honey | — | 40 |

The muffins were made by first creaming all of the dry ingredients before adding the liquid ingredients to the mix. The formulations for both bran and oat muffins came out very good without the use of eggs.

Example 14

Egg Replacement and Emulsifier System in Brownies

In this Example, brownies were prepared using a control mix and using the free-flowing composition prepared in Example 9. In this example, 100% of the egg was replaced. The formulation using the embodiment of the present disclosure was compared to a control formulation comprising eggs and emulsifiers separately. Table 14 presents the ingredients of the control formulation and the formulation including the composition of Example 9.

TABLE 14

Ingredients for Brownies

| Ingredient | #1 (grams) | #2 (grams) | #3 (grams) [with eggs] |
|---|---|---|---|
| Sugar | 290 | 290 | 290 |
| Cocoa Dutch | 70 | 70 | 70 |
| NFDM | 15 | 15 | 15 |
| Salt | 4 | 4 | 4 |
| Margarine | 75 | 75 | 75 |
| Cake Shortening | 75 | 75 | 75 |
| Vanilla | 2 | 2 | 2 |
| Free-flowing Composition (Example 9) | 70 | 70 | 70 |
| Corn Syrup | 100 | 120 | 120 |
| Hot Water | 120 | 110 | 100 |
| Cake Flour | 200 | 200 | 200 |
| Dry Eggs | — | — | 30 |

The first formulation was slightly dry, but with good volume. The second formulation was the best, with good volume and a moist consistency. The third formulation used dry eggs, and was not as good as the second formulation. The third formulation had a lower volume and reduced moisture.

Example 15

Egg Replacement and Emulsifier System in Rolls

In this Example, rolls were prepared using a control mix and using the free-flowing composition prepared in Example 9. In this example, 100% of the egg was replaced. The formulation using the embodiment of the present disclosure was compared to a control formulation comprising eggs and emulsifiers separately. Table 15 presents the ingredients of the control formulation and the formulation including the composition of Example 9.

TABLE 15

Ingredients for Rolls

| Ingredient | #1 (grams) [control] | #2 (grams) |
|---|---|---|
| Flour | 1000 | 1000 |
| Water | 620 | 620 |
| Yeast | 25 | 25 |
| NFDM | 50 | 50 |
| Soy Flour | 40 | 40 |
| Salt | 15 | 15 |
| Eggs | 50 | — |
| Free-flowing Composition (Example 9) | — | 50 |
| Sugar | 150 | 150 |
| Fat | 150 | 150 |

The control formulation produced good rolls that were fluffy and of a nice brown color. The formulation without eggs produced good rolls with lower volume and tenderness.

Example 16

Egg Replacement and Emulsifier System in Pound Cake, Cinnamon Rolls, Honey Cookies, and Flaxseed Cookies In this Example, pound cake, cinnamon rolls, honey cookies, and flaxseed cookies were prepared using the free-flowing composition prepared in Example 9. In this example, 100% of the egg was replaced in at least one embodiment of the pound cake, cinnamon rolls, honey cookies, and flaxseed cookies. Table 16 presents the ingredients of the control formulation and the formulations including the composition of Example 9.

TABLE 16

Ingredients for Pound Cake, Cinnamon Rolls, Honey Cookies, and Flaxseed Cookies

| Ingredient | Pound Cake 100% Replacement (grams) | Cinnamon Rolls 100% (grams) | Cinnamon Rolls 60% (grams) | Honey Cookies 100% (grams) | Flaxseed Cookies 100% Replacement (grams) |
|---|---|---|---|---|---|
| Cake Flour | 100 | — | — | — | — |
| Butter | 65 | 10 | 10 | 75 | 65 |
| Sugar | 80 | 18 | 18 | 80 | 100 |
| Free-flowing Composition (Example 9) | 25 | 30 | 18 | 6 | 10 |
| Water | 99 | 68 | 69 | 33 | 27 |
| Baking Powder | 2 | — | — | — | — |
| NFDM | 2 | 1 | 1 | 2 | — |
| Eggs | — | — | 2 | — | — |
| Salt | — | 1.5 | 1.5 | 1 | 1 |
| Bread Flour | — | 100 | 100 | 100 | 100 |
| Dry Yeast | — | 12 | 12 | — | — |
| Cinnamon | — | — | — | 1.5 | 1.5 |
| Ginger | — | — | — | .75 | .75 |
| Dry Honey | — | — | — | 15 | — |
| Flax Flour | — | — | — | — | 35 |

All formulations produced cake, rolls, and cookies of acceptable volume and consistency.

Although the foregoing description has presented a number of embodiments of the invention, those of ordinary skill in the relevant art will appreciate that various changes in the components, details, materials, and process parameters of the examples that have been herein described and illustrated in order to explain the nature of the invention may be made by those skilled in the art, and all such modifications remain within the principle and scope of the invention as expressed herein in the appended claims. It will also be appreciated by those skilled in the art that changes could be made to the embodiments described above without departing from the broad inventive concept thereof. It is understood, therefore, that this invention is not limited to the particular embodiments disclosed, but it is intended to cover modifications that are within the principle and scope of the invention, as defined by the claims.

We claim:

1. A free-flowing powder composition for reducing, replacing, or mimicking eggs in a baked good comprising:
    a wheat protein isolate, wheat gluten, or a combination thereof; and
    25-55% by weight of an emulsifier;
    wherein the composition has a flowability index on the Carr reference table of less than 18.

2. The free-flowing powder composition of claim 1, wherein the emulsifier is selected from the group consisting of a propylene glycol ester, a lecithin, a monoacylglyceride, a diacylglyceride, a triacylglyceride, an interesterified vegetable oil, sodium stearol lactylate, and combinations of any thereof.

3. The free-flowing powder composition of claim 1, further comprising a flow agent.

4. The free-flowing powder composition of claim 3, wherein the flow agent is selected from the group consisting of silicon dioxide, calcium stearate, magnesium stearate, maltodextrin, shellac, kaolin, kaolinite, calcium phosphate, tricalcium phosphate, sodium bicarbonate, potassium bicarbonate, sodium ferrocyanide, powdered cellulose, silicate, stearic acid and salts thereof, talcum, a starch, and combinations of any thereof.

5. A food product comprising the free-flowing powder composition of claim 1.

6. The food product of claim 5, further comprising an ingredient selected from the group consisting of an acidulant, a starch, a release agent, a leavening agent, a vitamin, a mineral, a plant sterol, a lignan extract, fructose, dextrose, molasses, honey, malt, high fructose corn syrup, a fruit piece, a dried fruit piece, a polyol, a protein concentrate, a flour, a vegetable oil, a chocolate piece, a chocolate coating, a wafer, a crisp, a digestion resistant soluble fiber, an artificial sweetener, a gum, and combinations of any thereof.

7. A process for producing a product that reduces, replaces, or mimics eggs in a baked good comprising:
    mixing a wheat protein isolate, wheat gluten, or a combination thereof with a flow agent, thus forming a dry blend; and
    mixing a liquid form of an emulsifier with the dry blend, thus forming a free-flowing powder having a flowability index on the Carr reference table of less than 18.

8. The process of claim 7, further comprising mixing the free-flowing powder with a flour and water to form a dough or batter.

9. The process of claim 7, wherein the emulsifier is selected from the group consisting of a propylene glycol ester, a lecithin, a monoacylglyceride, a diacylglyceride, a triacylglyceride, an interesterified vegetable oil, sodium stearol lactylate, and combinations of any thereof.

10. The process of claim 7, further comprising heating the liquid form of the emulsifier.

11. A composition for reducing, or mimicking eggs in a baked good comprising:
    25-55% by weight of wheat protein isolate, wheat gluten, or a combination thereof;
    1-30% by weight of a flow agent; and
    25-55% by weight of an emulsifier selected from the group consisting of a propylene glycol monoester, a monoacylglyceride, a lecithin, and combinations of any thereof;
    the composition being in the form of a powder.

12. The composition of claim 11, wherein the wheat protein isolate comprises a phosphate.

13. The composition of claim 11, wherein the powder has a flowability index on the Carr reference table of less than 18.

14. The composition of claim 11, wherein the emulsifier is the lecithin.

15. A food product comprising the composition of claim 11.

16. The composition of claim 11, wherein the composition consists of the wheat protein isolate, the flow agent, and the emulsifier.

17. The process of claim 7, further comprising mixing the free-flowing powder with a flour, thus producing a baked good mix.

18. The composition of claim 11, wherein the emulsifier comprises the propylene glycol monoester and the lecithin.

19. The composition of claim 11, wherein the flow agent is silicon dioxide and the emulsifier comprises the propylene glycol monoester, the monoacylglyceride, and the lecithin.

20. The free-flowing powder of claim 1, wherein the wheat protein isolate, the wheat gluten, or the combination thereof is the wheat protein isolate.

21. The free-flowing powder of claim 1, wherein the wheat protein isolate, the wheat gluten, or the combination thereof is the wheat gluten.

* * * * *